United States Patent [19]

Stiehler

[11] Patent Number: 5,619,298
[45] Date of Patent: Apr. 8, 1997

[54] FILM REWINDING APPARATUS FOR USE IN CASE OF CAMERA MALFUNCTION

[75] Inventor: Wayne E. Stiehler, Spencerport, N.Y.

[73] Assignee: Eastman Kodak Company, Rochester, N.Y.

[21] Appl. No.: 600,723

[22] Filed: Feb. 13, 1996

[51] Int. Cl.⁶ .............................. G03B 17/02; G03B 1/00
[52] U.S. Cl. .............................. 396/388; 396/538
[58] Field of Search .................................. 354/212, 214, 354/288

[56] References Cited

U.S. PATENT DOCUMENTS

| | | | |
|---|---|---|---|
| 3,679,148 | 7/1972 | Daitoku et al. | 354/214 |
| 4,202,614 | 5/1980 | Harvey | 354/121 |
| 4,870,437 | 9/1989 | Omaki et al. | 354/214 |
| 5,305,039 | 4/1994 | Dassero | 354/288 |
| 5,311,231 | 5/1994 | Suzuki et al. | 354/288 |
| 5,384,613 | 1/1995 | Coutier et al. | 354/275 |
| 5,450,150 | 9/1995 | Smart et al. | 354/203 |

FOREIGN PATENT DOCUMENTS

0652467A1   5/1995   European Pat. Off. ........ G03B 17/30

*Primary Examiner*—Safet Metjahic
*Assistant Examiner*—Eddie C. Lee
*Attorney, Agent, or Firm*—Roger A. Fields

[57] ABSTRACT

A camera comprises a chamber for receiving a film cartridge that contains a film spool having a spool end which is exposed to allow it to be engaged for rotation to wind a filmstrip into the cartridge, and a door for the chamber that covers the spool end. The door has a normally light-tight access opening arranged to be located over the spool end to permit a spool driver to be inserted through the access opening to engage the spool end for rotation to wind the filmstrip into the cartridge without having to open the door.

4 Claims, 8 Drawing Sheets

FILM REWINDING APPARATUS FOR USE IN CASE OF CAMERA MALFUNCTION

CROSS-REFERENCE RELATED APPLICATION

Reference is made to commonly assigned copending application Ser. No. 08/568,214 [our Docket No. 71517], entitled CAMERA WITH MEANS FOR PREVENTING A CARTRIDGE LIGHT LOCK FROM MOVING FROM AN OPEN TO A CLOSED POSITION WHEN A FILMSTRIP PROTRUDES OUT OF THE CARTRIDGE and filed Jun. 29, 1995 in the names of Patricia L. Williams and Robert L. Kuhn, Jr.

The cross-referenced application is incorporated in this application.

FIELD OF THE INVENTION

The invention relates generally to the field of photography, and in particular to cameras. More specifically, the invention relates to manually operated film rewinding apparatus for use in case of a camera malfunction.

BACKGROUND OF THE INVENTION

It is known as disclosed in commonly assigned U.S. Pat. No. 5,450,150, issued Sep. 12, 1995, for a film cartridge to be capable of thrusting a non-protruding end of a filmstrip out of the cartridge interior. The filmstrip is coiled about a film spool in the cartridge interior, and its non-protruding end is thrust out of the cartridge interior responsive to unwinding rotation of the film spool. A normally closed light-shielding door of the film cartridge is opened to permit film movement into and out of the cartridge interior. When the filmstrip is exposed and completely returned to the cartridge interior, in a camera, the light-shielding door is re-closed and a visual exposure indicator coaxially connected to the film spool is parked in a film-exposed indicating position that visibly indicates the filmstrip is exposed. Thus, the film spool must be parked in a final rotational position to park the visual exposure indicator in its film-exposed indicating position.

If the camera has a film transporting malfunction when a film section is outside the film cartridge, a problem arises as to how to return the film section to the film cartridge without first opening the camera and exposing the film section to ambient light.

SUMMARY OF THE INVENTION

According to one aspect of the invention, a camera comprising a chamber for receiving a film cartridge that contains a film spool having a spool end which is exposed to allow it to be engaged for rotation to wind a filmstrip into the cartridge, and a door for the chamber that covers the spool end, is characterized in that:

the door has an access opening arranged to be located over the spool end to permit a spool driver to be inserted through the access opening to engage the spool end for rotation to wind the filmstrip into the cartridge without having to open the door, and includes light-trapping means for light-tightly sealing the access opening but which can be disabled in order to insert the spool driver into the access opening. Preferably, the light-trapping means includes a plug which is configured to be received in the access opening to light-tightly seal the access opening and is removable from the access opening in order to insert the spool driver into the access opening.

According to another aspect of the invention, a method of rotating a film spool in a film cartridge in a camera to wind a filmstrip into the cartridge without having to open the camera, comprises:

removing a plug from an access opening in the camera which is arranged over an exposed end of the film spool;

inserting a spool driver through the access hole and into engagement with the spool end; and rotating the spool driver to rotate the film spool.

According to another aspect of the invention, a spool driver for rotating a film spool in a film cartridge in a camera to wind a filmstrip into the cartridge without having to open the camera, comprises:

manually rotatable means configured for insertion through an access opening in the camera which is arranged over an exposed end of the film spool and for engagement with the spool end to rotate the film spool; and a visible alignment indicator arranged on said manually rotatable means to be aligned with a visible alignment indicator on the camera for indicating a final rotational position of the manually rotatable means to park the film spool in a corresponding final rotational position.

DETAILED DESCRIPTION OF THE INVENTION

The invention is disclosed as being embodied preferably in a camera for use with a film cartridge of the type disclosed in U.S. Pat. No. 5,450,150. Because the features of a camera are generally known, the description which follows is directed in particular only to those elements forming part of or cooperating directly with the disclosed embodiment. It is to be understood, however, that other elements may take various forms known to a person of ordinary skill in the art.

U.S. Pat. No. 5,450,150 is incorporated in this application.

Figure 1:
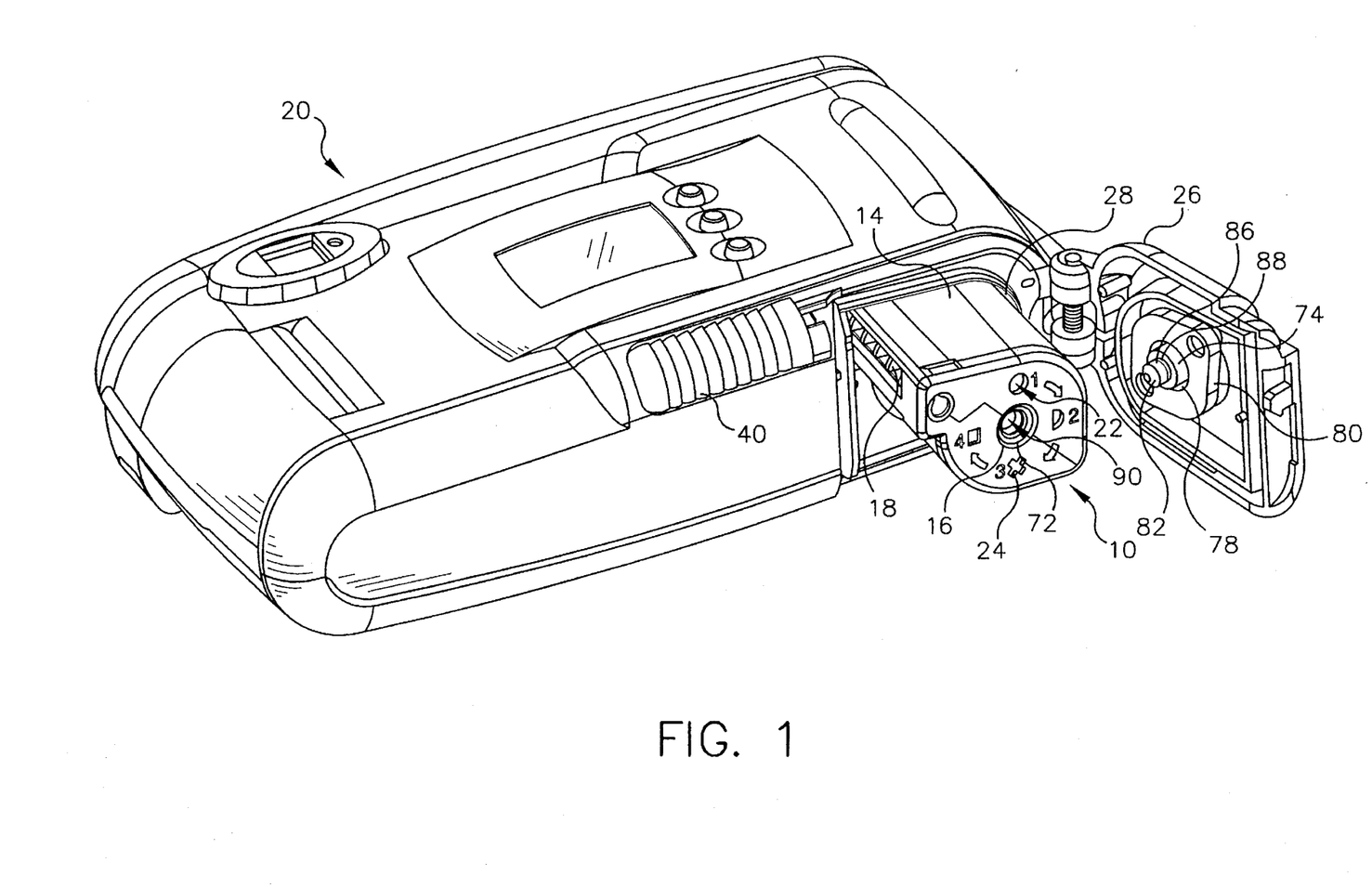
FIG. 1 is a perspective view of a camera having a door that opens to end-load a film cartridge such as disclosed in U.S. Pat. No. 5,450,150, into a chamber in the camera.
Figure 8:
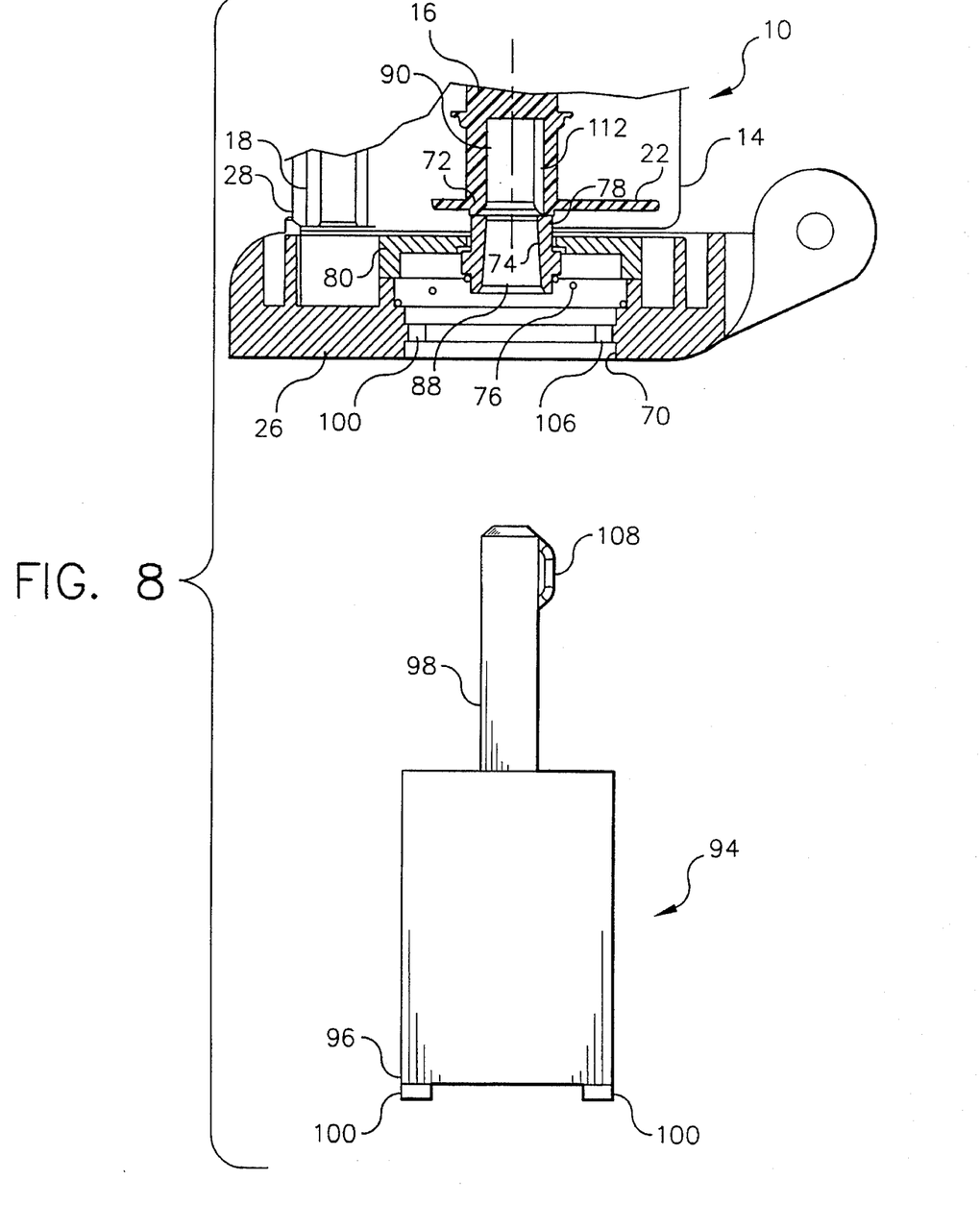
FIG. 8 is a sectional view of the exposed end of the film spool and the access opening in the door aligned with the special tool, showing how a datum bushing connected to the door is spring-urged against the exposed end of the film spool to prevent ambient light which enters the access opening when the plug is removed from the access opening from entering the chamber containing the film cartridge.
Figure 9:
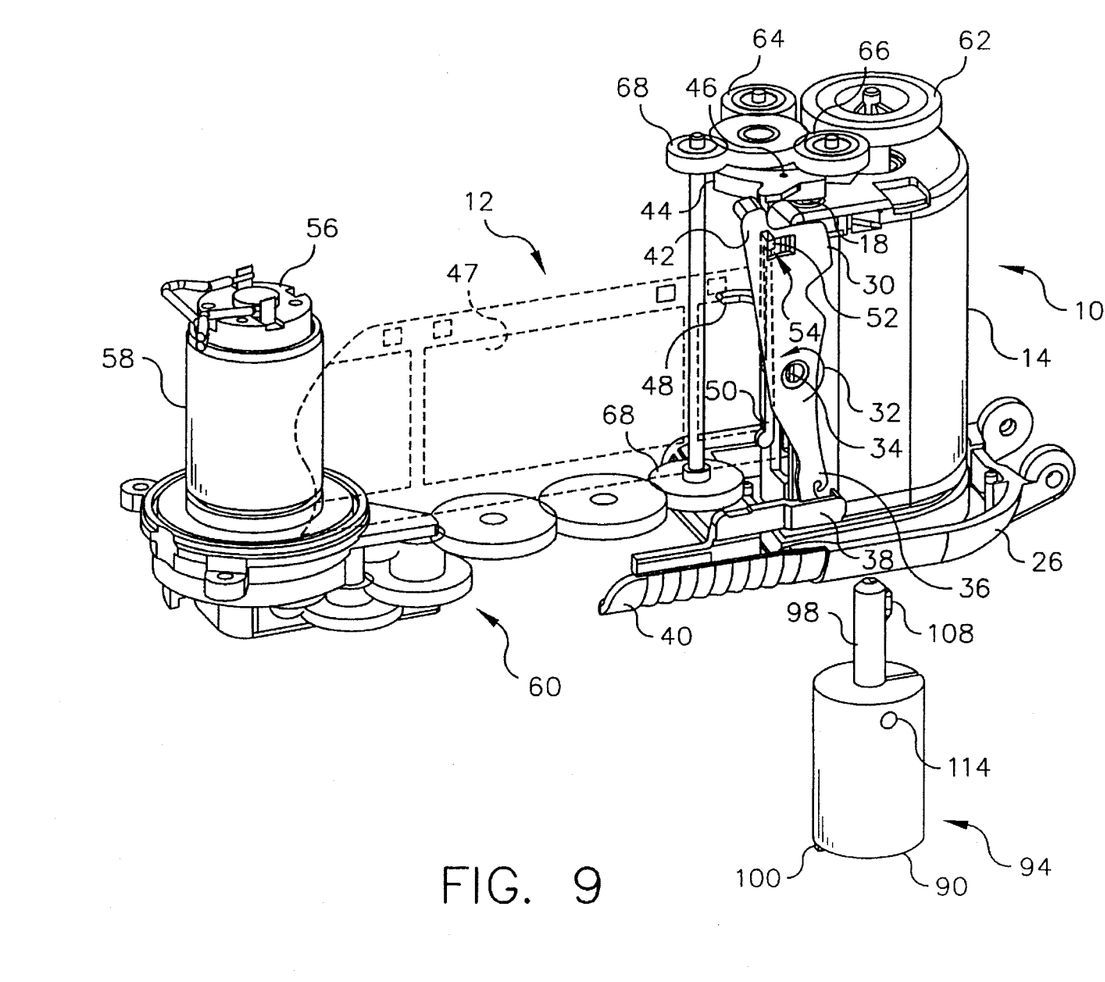
FIG. 9 is a perspective view of a motorized film transport assembly in the camera.

Referring now to the drawings, a film cartridge 10 such as disclosed in U.S. Pat. No. 5,450,150 is shown in FIGS. 1, 8 and 9. The film cartridge 10 is capable of thrusting a non-protruding leading end of a filmstrip 12 out of a cartridge housing or shell 14. The filmstrip 12 is coiled about a film spool 16 inside the cartridge housing 14, and its non-protruding leading end is thrust from the cartridge housing responsive to unwinding rotation of the film spool. A normally closed light-shielding door or active light lock 18 of the film cartridge 10 is opened to permit film movement into and out of the cartridge housing 14. When the filmstrip 12 is exposed and completely returned to the cartridge housing 14, in a camera 20, the active light lock 18 is re-closed and a visual exposure indicator disk 22 coaxially connected to the film spool 16 is parked in a film-exposed indicating position, beneath a corresponding film-exposed indicator window 24 in one end of the cartridge housing, to visibly indicate that the filmstrip is exposed. Thus, the film spool 16 must be parked in a final rotational position to park the visual exposure indicator disk 22 in its film-exposed indicating position.

Figure 3:
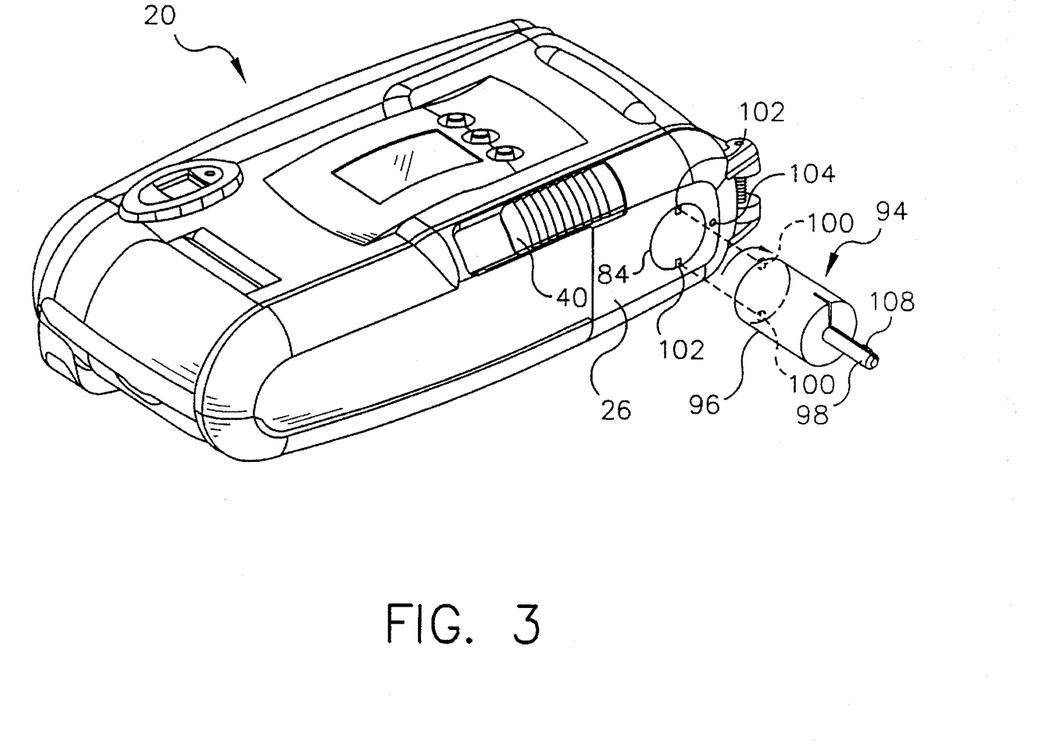
FIG. 3 is a perspective view of the camera and a special tool that is used to rotate the plug from a secured position to a released position to permit the plug to be removed from the access opening in the door.
Figure 4:
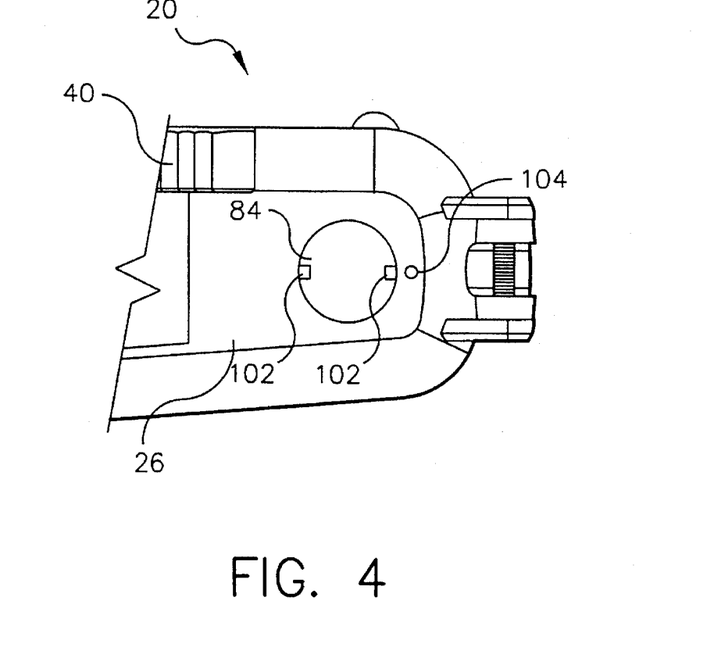
FIG. 4 is a plan view of the plug in its released position.
Figure 5:
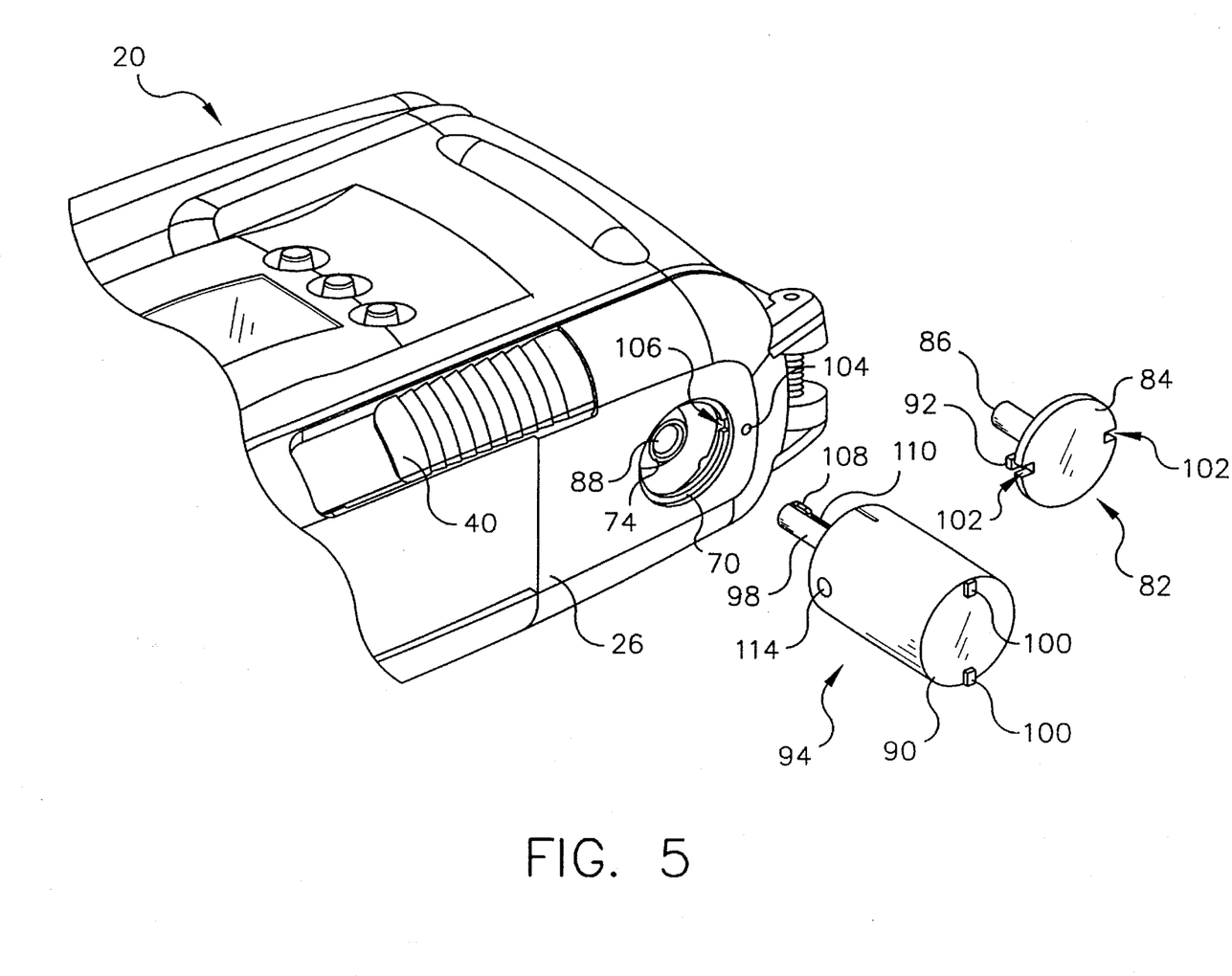
FIG. 5 is a perspective view of the camera with the plug removed from the access opening in the door, showing the special tool aligned with the access opening in order to be inserted through the access opening to rotationally engage an exposed end of a film spool in the cartridge interior to rotate the film spool to wind a film section into the cartridge interior in case of a film transporting malfunction in the camera.

Looking at the camera 20 as shown in FIGS. 1 and 9, a door 26 is swung open to uncover a loading chamber 28 for receiving the film cartridge 10 one-end-first. A drive lever 30 is urged via a return spring 32 to pivot in a counter-clockwise direction in FIG. 9 about a support pin 34, and it has one end 36 operatively coupled to an extension 38 of a slidable latch 40 and another end 42 operatively coupled to an opening/closing lever 44 pivotable about a support pin 46. When the door 26 is closed, and the latch 40 is manually released from being held in a non-latching position separated from the door as shown in FIG. 1, the return spring 32 is free to pivot the drive lever 30 counter-clockwise to draw the latch 40 from its non-latching position to a latching position securing the door closed as shown in FIGS. 3, 4 and 9 and to pivot the opening/closing lever 44 clockwise to open the active light lock 18 as shown in FIG. 9. Conversely, when the latch 40 is manually pushed to its non-latching position, it pivots the drive lever 30 clockwise in FIG. 9 against the opposite urging of the return spring 32 in order to pivot the opening/closing lever 44 counter-clockwise to close the active light lock 18 as shown in FIG. 1. If any film section 47 of the filmstrip 12 is located outside the cartridge housing 14 as shown in FIG. 9, the film section presses against a film sensing finger 48 of a pivotable interlock lever 50 to pivot the interlock lever to insert a locking finger 52 of the interlock lever in an opening 54 in the drive lever 30.

The locking finger 52 in the opening 54 prevents the drive lever 30 from being pivoted clockwise to close the active light lock 18 and, thus, prevents the latch 40 from being manually pushed to its non-latching position. Once, the filmstrip 12 is completely returned to the cartridge housing 14, however, a return spring (not shown) pivots the interlock lever 50 to withdraw the locking finger 52 from the opening 54, freeing the drive lever 30 to be pivoted clockwise to close the active light lock 18 in response to manually pushing the latch 40 towards its non-latching position. Further details of this aspect of the camera 20 are described in the cross-referenced incorporated application.

Figure 10:
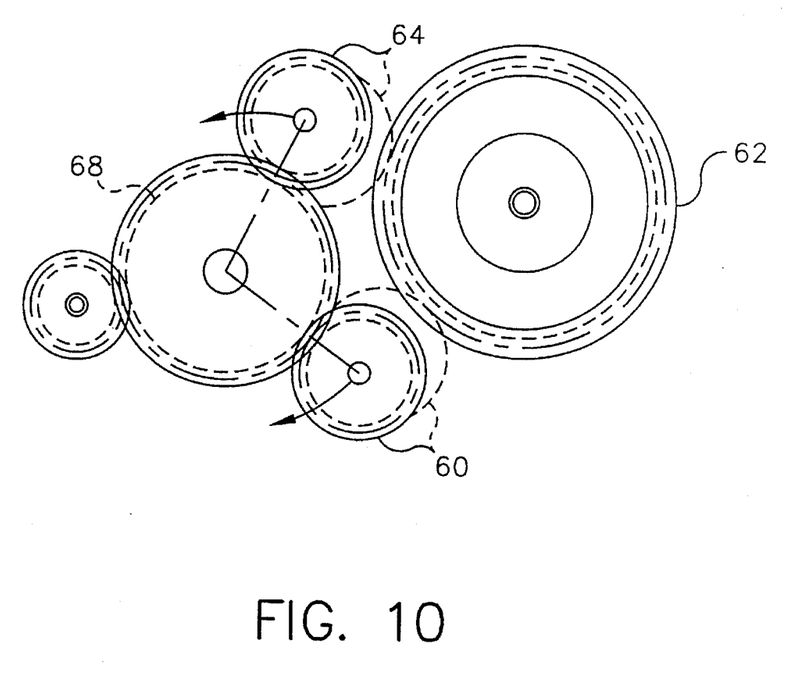
FIG. 10 is a schematic depiction of a gear train of the motorized film transport assembly.

As shown in FIGS. 9 and 10, a battery-powered motor 56 is located inside a hollow film take-up drum 58 and is operatively coupled to a film transport gear train 60 for the take-up drum and the film spool 16. The gear train 60 includes a spool drive gear 62 coaxially engaged with the film spool 16 and adapted to peripherally mesh one-at-a-time with a displaceable thrust planetary gear 64 and a displaceable rewind planetary gear 66. The thrust and rewind planetary gears 64 and 66 are in continuous peripheral mesh with a sun gear 68 which is operatively coupled to the motor 56. When the motor 56 begins a film thrust mode, the sun gear 68 initially is rotated clockwise in FIG. 10 to rotate the thrust planetary gear 64 counterclockwise into mesh with the spool drive gear 62 and to rotate the rewind planetary gear 66 counter-clockwise out of mesh with the spool drive gear. Then, viewing FIG. 10, the motor 56 (in its film thrust mode) continues to rotate the sun gear 68 clockwise and the thrust planetary gear 64 counterclockwise to rotate the spool drive gear 62 clockwise, which causes the film spool 16 to be rotated to thrust the non-protruding leading end of the filmstrip 12 out of the cartridge housing 14 to the take-up spool 58. At this time, the motor 56 windingly rotates the take-up drum 58 to take-up the filmstrip 12. Conversely, when the motor 56 begins a film rewind mode, the sun gear 68 initially is rotated counter-clockwise in FIG. 10 to rotate the thrust planetary gear 64 clockwise out of mesh with the spool drive gear 62 and to rotate the rewind planetary gear 66 clockwise into mesh with the spool drive gear. Then, as viewed in FIG. 10, the motor 56 (in its film rewind mode) continues to rotate the sun gear 68 counter-clockwise and the rewind planetary gear 66 clockwise to rotate the spool drive gear 62 counter-clockwise, which causes the film spool 16 to be rotated to rewind the filmstrip 12 into the cartridge housing 14. At this time, the take-up drum 58 is disconnected from the motor 56 to allow it to idle.

Figure 2:
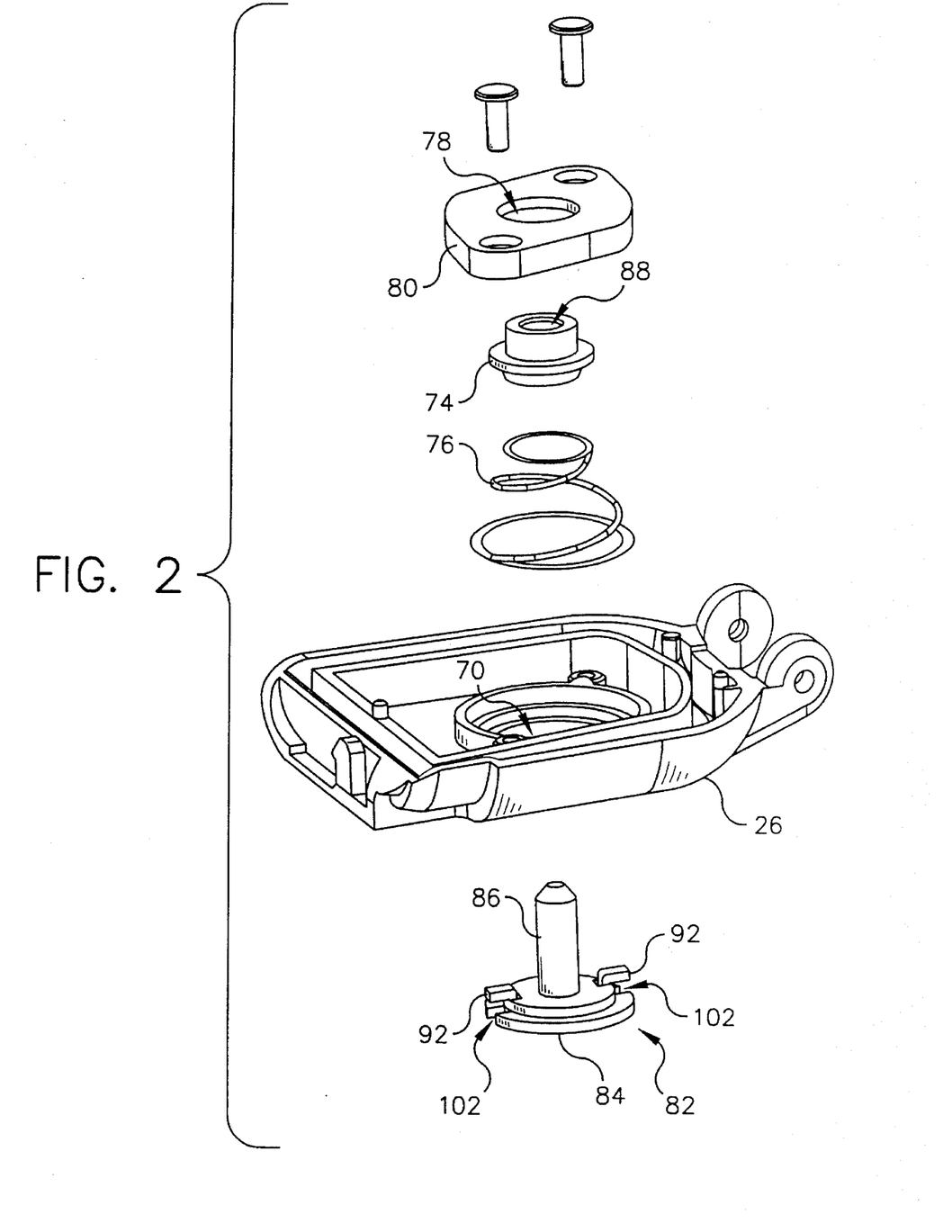
FIG. 2 is an exploded perspective view of the door including a plug for an access opening in the door.

As shown in FIG. 8, the door 26 has an access opening 70 arranged to be located directly over an exposed end 72 of the film spool 16 when the door is closed. A datum bushing 74 is urged via a compression spring 76 to protrude from a central opening 78 in a bushing retainer 80 which is screwed to the underside of the door 26. See FIG. 2. When the door 26 is closed, the datum bushing 74 is spring-urged snugly against the spool end 72. See FIG. 8. At this time, the datum bushing 74 and the bushing retainer 80 serve to prevent ambient light within the access opening 70 from being reflected into the loading chamber 28.

As shown in FIGS. 1–5, a plug 82 comprises a flange 84 and a depending pin 86. The pin 86 is configured to be inserted through the access opening 70 and an aligned opening 88 in the datum bushing 74 and into a coaxial hole 90 in the spool end 72, when the door 26 is closed, to coaxially support the spool end and to light-tightly seal the access opening. A pair of opposed locking tabs 92 project from the underside of the flange 84 normally into engagement with the door 26 to prevent the pin 86 from falling out of the access opening 70.

A special manual tool 94, to be used in case of a malfunction of the motor 56 and/or the gear drive train 60, comprises a release portion 96 for the plug 82 and a driver portion 98 for the film spool 16. As shown in FIG. 3, the release portion 96 has a pair of opposed drive lugs 100 configured to be inserted into a pair of mating notches 102 in the flange 84, to permit manual rotation of the special tool 94 to similarly rotate the plug 82. Once the plug 82 is rotated to align the two notches 102 in the flange 84 with a visible dot-like indicator 104 on the door 26, as shown in FIG. 4, the two locking tabs 93 will be located in respective interior cavities 106 in the door at the access opening 70 to allow the plug to be removed from the door. See FIGS. 5 and 8.

Figure 6:
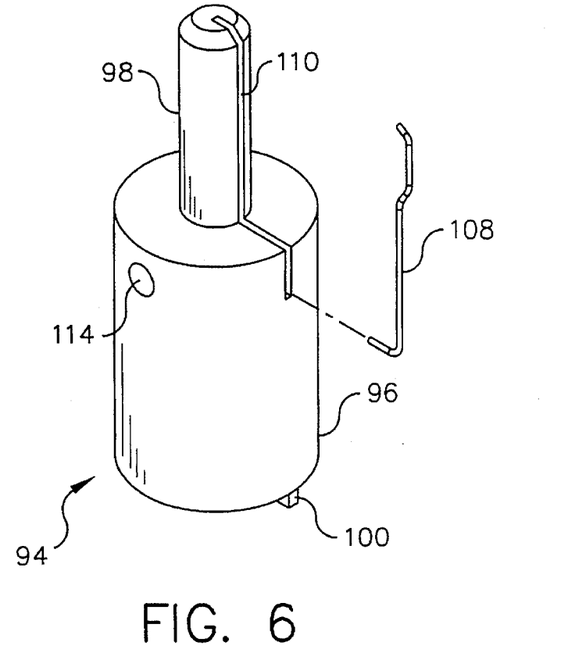
FIG. 6 is an exploded perspective view of the special tool including a spring-leg part for rotationally engaging the exposed end of the film spool in the cartridge interior.
Figure 7:
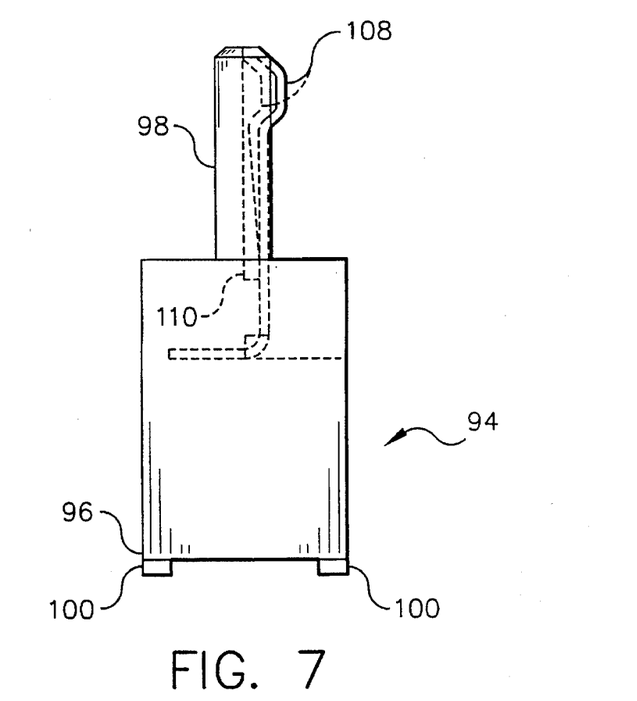
FIG. 7 is an elevation view of the special tool including the spring-leg part.

The driver portion 98 of the special manual tool 94 includes a protruding spring leg part 108 which as shown in FIGS. 6 and 7 is depressible into an L-shaped slit 110. The opening 88 in the datum bushing 74 has a minimum diameter that is less than the constant diameter of the coaxial hole 90 (including a key way extension 112 of the coaxial hole) in the spool end 72. See FIG. 8. When the driver portion 98 is inserted through the access opening 70 initially into the opening 88, the spring leg part 108 is depressed into the slit 110. Further insertion of the driver portion 98 through the access opening 70 and into the coaxial hole 90 allows the spring leg part 108 to pop part-way out of the slit 110 and into the key way extension 112, to rotationally engage the film spool 16, when the driver portion is rotated within the coaxial hole to locate the spring leg part opposite the key way extension.

Figure 11:
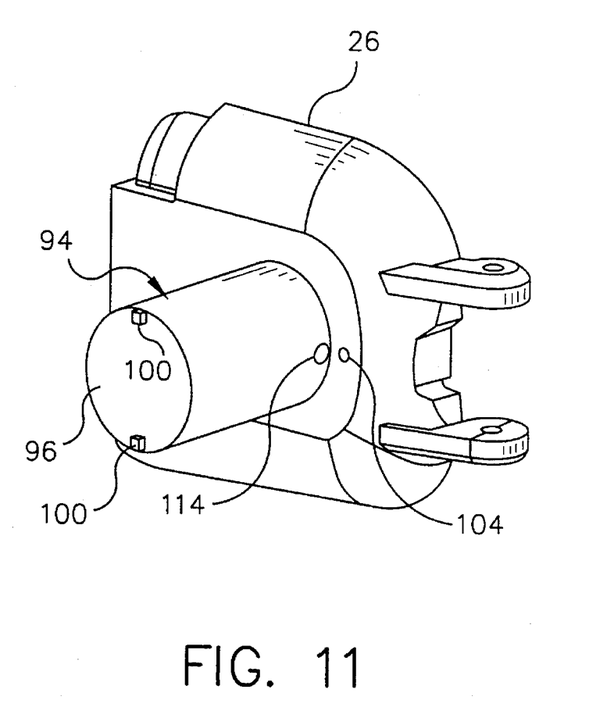
FIG. 11 is a perspective view of the special tool and the door, showing respective visible alignment indicators on the special tool and the door for parking the special tool in a final rotational position to park the film spool in a corresponding final rotational position which locates a visual exposure indicator of the film cartridge in a film-exposed indicating position.

Once the driver portion 98 is rotationally engaged with the film spool 16, the special tool 94 can be manually rotated to rotate the film spool to rewind the filmstrip 12 into the cartridge housing 14. If the motor 56 failed during winding of the filmstrip 12 onto the take-up drum 58, the thrust planetary gear 64 should be in mesh with the spool drive gear 62 and the rewind planetary gear 66 should not be in mesh with the spool drive gear. Conversely, if the motor 56 failed during winding of the filmstrip 12 onto the film spool 16, the rewind planetary gear 66 should be in mesh with the spool drive gear 62 and the thrust planetary gear 66 should not be in mesh with the spool drive gear. Initially, as viewed in FIGS. 9 and 10, the special tool 94 is to be rotated clockwise a partial revolution to similarly rotate the spool drive gear 62 (via the film spool 16) in order to rotate the thrust planetary gear 64 counter-clockwise out of mesh with the spool drive gear 62 in the event the motor 56 failed during winding of the filmstrip 12 onto the take-up drum 58. Then, the special tool 94 is to be rotated counter-clockwise a partial revolution to similarly rotate the spool drive gear 62 (via the film spool 16) in order to rotate the rewind planetary gear 66 counter-clockwise out of mesh with the spool drive gear in the event the motor 56 failed during winding of the filmstrip 12 onto the film spool. Finally, the special tool 94 must be rotated counter-clockwise to similarly rotate the film spool 16 in order to rewind the filmstrip 12 completely into the cartridge housing 14. As shown in FIG. 11, the special tool 94 is then parked with a visible dot-like indicator 114 on the special tool facing the similar indicator 104 on the door 26. This is done to park the visual exposure indicator disk 22 coaxially connected to the film spool 16 in the film-exposed indicating position, beneath the film-exposed indicator window 24 in one end of the cartridge housing 14, to visibly indicate that the filmstrip 12 is exposed.

The invention has been described with reference to a preferred embodiment. However, it will be appreciated that variations and modifications can be effected by a person of ordinary skill in the art without departing from the scope of the invention.

PARTS LIST 10. film cartridge
12. filmstrip
14. cartridge housing
16. film spool
18. active light lock
20. camera
22. visual exposure indicator disk
24. film-exposed indicator window
26. door
28. loading chamber
30. drive lever
32. return spring
34. support pin
36. lever end
38. latch extension
40. latch
42. lever end
44. opening/closing lever
46. support pin
47. film section
48. film sensing finger
50. interlock lever
52. locking finger
54. lever opening
56. motor
58. film take-up drum
60. film transport gear train
62. spool drive gear
64. thrust planetary gear
66. rewind planetary gear
68. sun gear
70. access opening
72. spool end
74. datum bushing
76. compression spring
78. central opening
80. bushing retainer
82. plug
84. flange
86. pin
88. bushing opening
90. coaxial hole
92, 92. locking tabs
94. special tool
96. release portion
98. driver portion
100, 100. drive lugs
102, 102. notches
104. dot-like indicator
106, 106. cavities
108. spring leg part
110. slit
112. key way extension
114. dot-like indicator

I claim:

1. A camera comprising a chamber for receiving a film cartridge that contains a film spool having a spool end which is exposed to allow the spool end to be engaged for rotation to wind a filmstrip into the cartridge, and a door for said chamber that covers the spool end, is characterized in that:

said door has an access opening arranged to be located over the spool end to permit a spool driver to be inserted through said access opening to engage the spool end for rotation to wind the filmstrip into the cartridge without having to open the door; and a datum bushing spring-urged against the spool end has a through opening for the spool driver which is located to be simultaneously aligned with said access opening and a coaxial hole in the spool end and which has a diameter sufficiently less than the diameter of the coaxial hole in the spool end to cause said datum bushing to compress a resilient part of the spool driver to allow the resilient part to expand into a key way extension from the coaxial hole in the spool end to thereby engage the spool end.

2. A camera as recited in claim 1, wherein a plug for said access opening includes a pin for projecting into the coaxial hole in the spool end to coaxially support the spool end when the plug is located in said access opening.

3. A camera comprising a chamber for receiving a film cartridge that contains a film spool having a spool end which is exposed to allow it to be engaged for rotation to wind a filmstrip into the cartridge, and a door for said chamber that covers the spool end, is characterized in that:

said door has an access opening arranged to be located over the spool end to permit a spool driver to be inserted through said access opening to engage the spool end for rotation to wind the filmstrip into the cartridge without having to open the door, and includes light-trapping means located to be in contact with the spool end to prevent ambient light which enters said access opening from entering said chamber to expose the filmstrip.

4. A camera as recited in claim 3, wherein said light-trapping means includes a datum bushing coupled to said door and spring-urged against the spool end.

* * * * *